United States Patent

Ware

[15] 3,664,063
[45] May 23, 1972

[54] PLANT GROWTH APPARATUS

[72] Inventor: R. Louis Ware, 2108 Middle Fork Road, Northfield, Ill. 60093

[22] Filed: Sept. 21, 1970

[21] Appl. No.: 73,894

Related U.S. Application Data

[63] Continuation-in-part of Ser. No. 751,207, Aug. 8, 1968, Pat. No. 3,529,379.

[52] U.S. Cl. ...................................47/39, 108/23, 240/81, D80/9, D35/3
[51] Int. Cl. ..........................................A01g 9/02
[58] Field of Search ...........................D80/9, 9.1; D35/3; 211/133–134; 312/223; 47/1, 1.2, 18, 17, 36, 39; 119/5; 240/81; 40/130; 315/97; 108/23, 59, 92, 106–107

[56] References Cited

UNITED STATES PATENTS

| | | | |
|---|---|---|---|
| 2,540,353 | 2/1951 | Schick | 108/23 |
| 3,233,146 | 1/1966 | Vacha | 315/97 |
| 3,314,192 | 4/1967 | Park | 47/18 |
| 3,529,379 | 9/1970 | Ware | 47/17 |
| 3,538,862 | 11/1970 | Patriarca | 108/59 |

*Primary Examiner*—Robert E. Bagwill
*Attorney*—Birch, Swindler, McKie & Beckett

[57] ABSTRACT

A plant growth apparatus in which plants are supported on shelves and exposed to a predetermined level of illumination by a bank of fluorescent tubes. To provide an aesthetically pleasing structure the ballast for the fluorescent tubes is arranged and connected to provide a significant saving in wiring.

4 Claims, 6 Drawing Figures

Patented May 23, 1972

INVENTOR
R. LOUIS WARE

BY Birch, Swindler,
McKie & Beckett
ATTORNEYS

Patented May 23, 1972

3,664,063

Patented May 23, 1972

PLANT GROWTH APPARATUS

RELATED APPLICATION:

This application is a Continuation-in-part of application No. 751,207 filed Aug. 8, 1968, now U.S. Pat. No. 3,529,379.

BACKGROUND OF THE INVENTION:

This invention relates to an apparatus for supporting growing plants.

Plant propogation chambers and apparatus for supporting plants while placing them in contact with certain environmental conditions which contribute to the growth of the plants are well known. Generally, however, such structures require complex electrical wiring in order to provide the necessary number of fluorescent or other types of artificial light fixtures and are therefore required to be of complex design to accommodate this electrical wiring. This is especially true when fluorescent lighting is used. Because of their complex design the structures advanced by the prior art are not aesthetically pleasing and detract from the appeal of the plants placed upon them.

SUMMARY OF THE INVENTION

The present invention is directed to improvements in plant growth apparatus and provides a novel structure which is particularly well adapted for use as a display device, and in which the electrical wiring is simplified in a novel manner, contributing to the aesthetic appeal of the apparatus.

It is an object of this invention to provide a novel plant growth apparatus that is of trim structure and has great aesthetic appeal.

It is another object of this invention to provide a novel plant growth apparatus having a bank of fluorescent tubes in which the plants are exposed to a predetermined level of illumination.

Another object of this invention is to provide a novel plant growth apparatus having a bank of fluorescent tubes in which ballast for the fluorescent tubes is arranged and connected to provide a significant saving in wiring.

Further objects and advantages of the invention will appear from the following description and the accompanying drawings.

DESCRIPTION OF THE PREFERRED EMBODIMENTS

Figure 1:
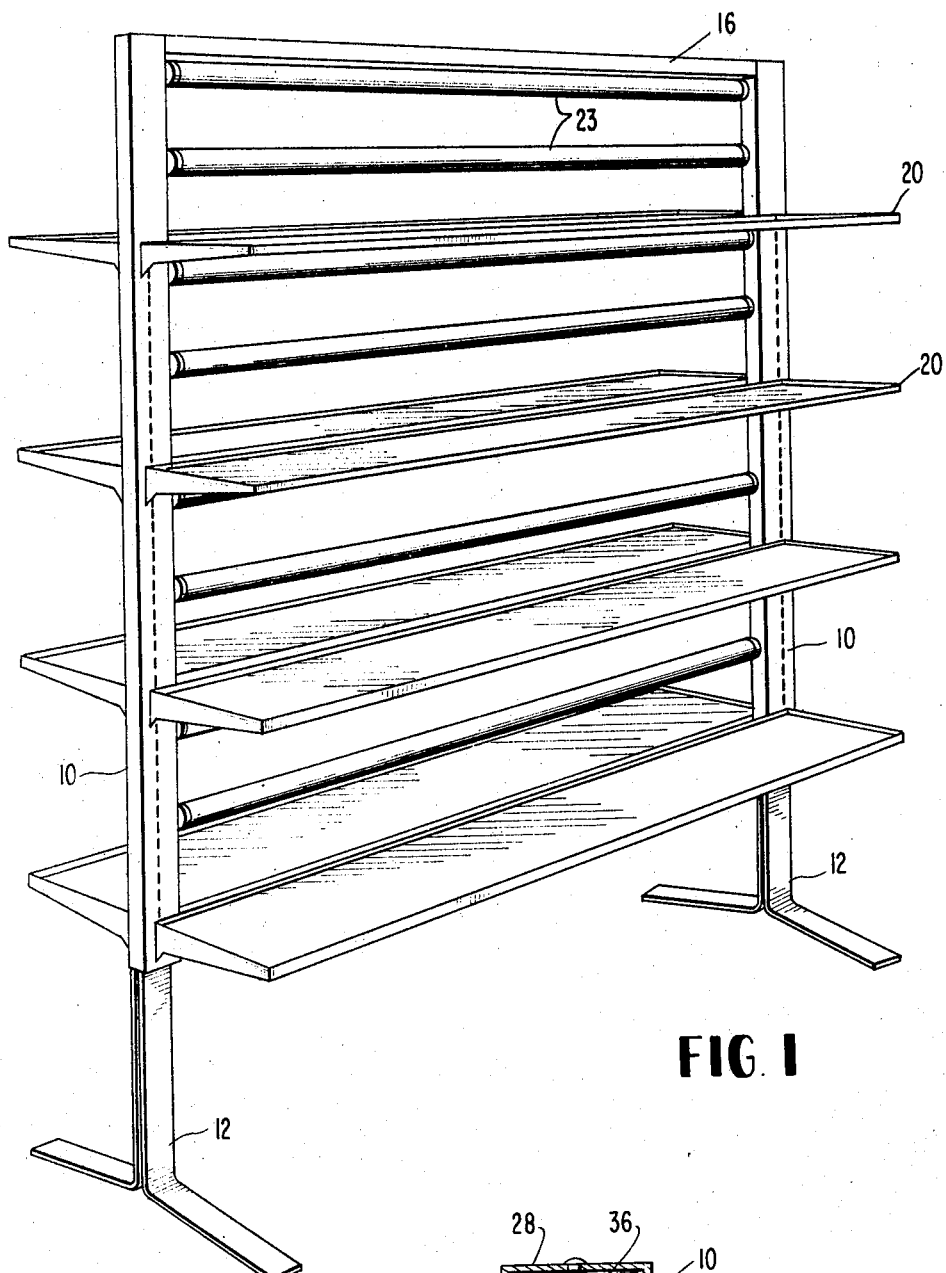
FIG. 1 is a perspective view of a plant growth apparatus in accordance with the invention.

Referring to the drawings, and particularly to FIG. 1, the basic structure of the plant growth apparatus consists of a pair of horizontally opposed upright columns 10 which are supported by legs 12. Legs 12 can be equipped with casters or other suitable means (not shown) for allowing the plant growth apparatus to be wheeled from place to place. Columns 10 can be attached together at the upper portion thereof by a cross brace 16. A lower cross brace (not shown) may also be attached to columns 10 at the lower portions thereof. A plurality of trays 20 are supported by columns 10. Trays 20 can be arranged in a single vertical row on one side of columns 10, or can be arranged in a double row on both sides of column 10, as shown in FIG. 1. Columns 10 can be provided with means for allowing adjustment of the trays. Also supported by columns 10 are a plurality of fluorescent tubes 23 which are connected to sockets carried by supports 10. Although shown in FIG. 1 as free-standing upon legs 12, columns 10 can be supported in other manners, such as by attaching them to a wall. In such a case, of course, trays 20 would be mounted only on one side of columns 10.

Figure 2:
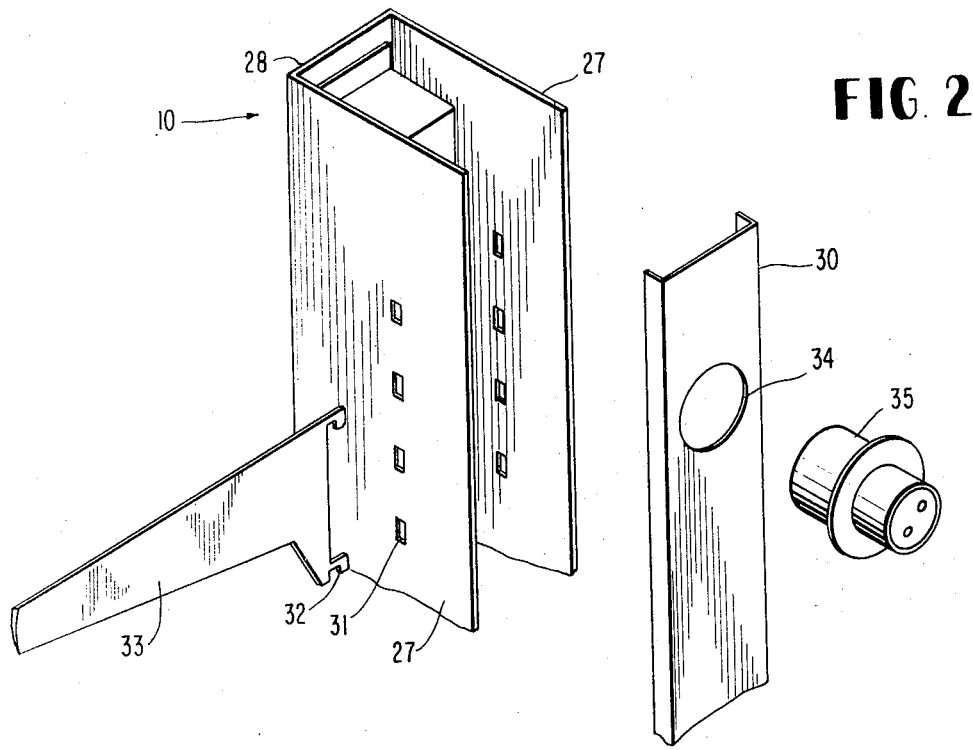
FIG. 2 is an exploded perspective view of a first arrangement of the upright column, tray support, and ballast of the invention.

FIG. 2 shows the details of construction of a first embodiment of the invention. Columns 10 are each in the form of a capped U-shaped channel, having legs 27 and a base 28. Cap 30 is attached to legs 27 by any suitable means, and can be fixedly or removably attached, the latter method allowing access to the interior of columns 10. Legs 27 contain a plurality of tray support openings 31. Tray support bracket 33 has hooks 32 which are received by openings 31 to support trays 20. By virtue of the fact that columns 10 contain a plurality of openings 31, tray brackets 33 are adjustable and the position of trays 20 can be adjusted. Cap 30 contains a plurality of tube socket receiving openings 34 into which tube sockets 35 are received. Ballast units 36 are installed within the confines of columns 10 by any suitable means.

Figure 3:
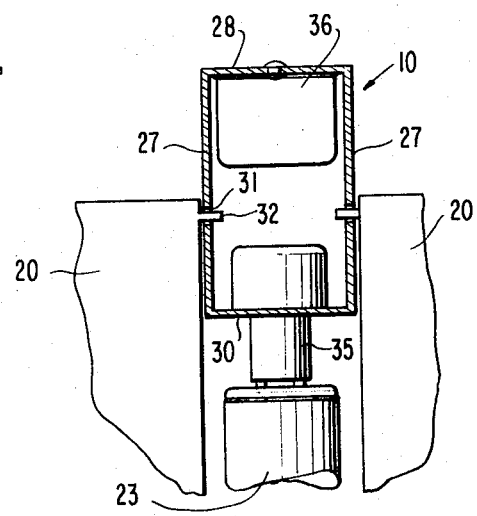
FIG. 3 is a plan view of the inter-relationship of vertical column, trays, ballast, and fluorescent fixture.

The inter-relationship of the above mentioned elements are shown in FIG. 3. Column 10 supports trays 20 by means of openings 31 engaged by tray support bracket hooks 32. Channel 10 also supports ballast 36 and a plurality of fluorescent tube sockets 35 into which fluorescent tubes 23 are plugged.

Figure 4:
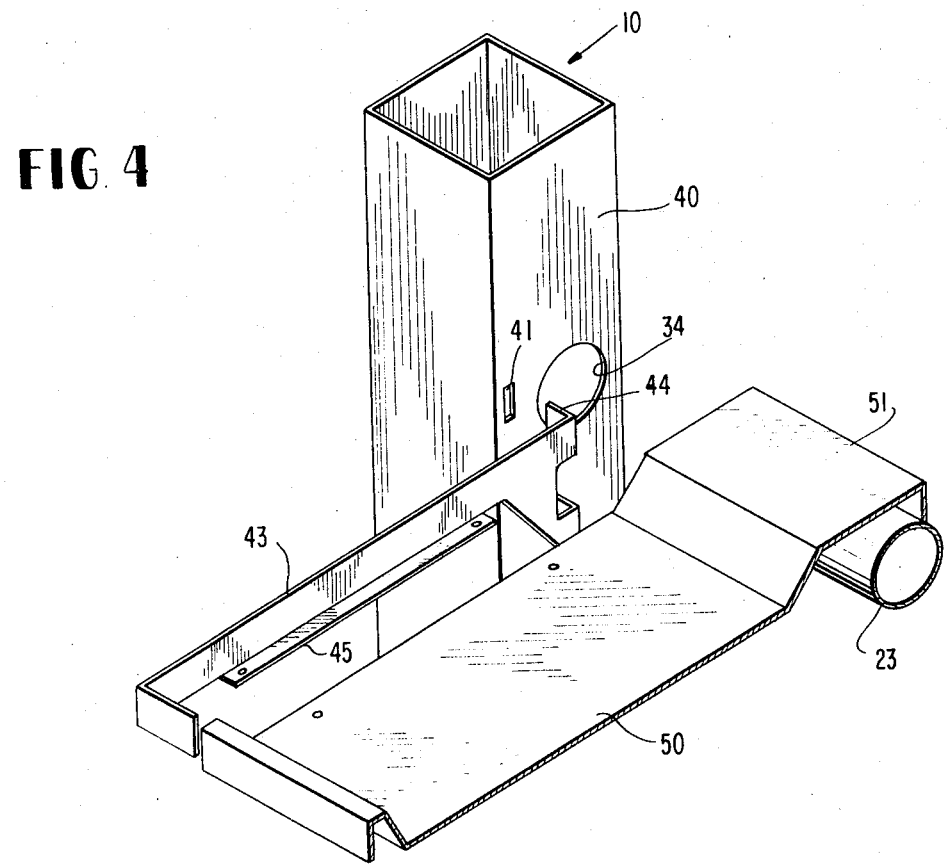
FIG. 4 is an exploded perspective view of a second arrangement of the upright column, tray support, and ballast.

Shown in FIG. 4 is an alternative construction of the column and tray support. The arrangement shown in FIG. 4 is particularly advantageous when it is desired to install shelves on only one side of channels 10, for example, when constructing a plant growth apparatus that is suspended from a wall. In FIG. 4, columns 10 are shown as extrusions, and the side 40 facing the other column 10 is provided with a plurality of tray support openings 41. Tray support brackets 43 have angled hook portions 44 to engage openings 41. Tray 50 is supported by bracket 43 by means of a flange 45. Tray 50 can extend rearwardly into the plane of columns 10 to cover fluorescent tube 23 with portion 51. As in the previously described embodiment, side 40 includes a plurality of tube socket receiving openings 35.

Figure 5:
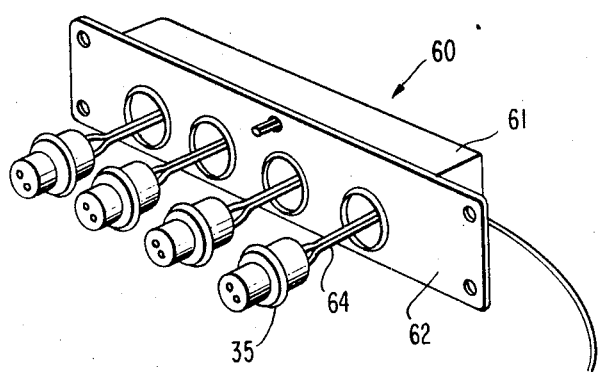
FIG. 5 is an exploded perspective view of a combination ballast and four tube socket assembly in accordance with this invention.

In the previous Figures, fluorescent tubes 23 have been mounted in single units vertically spaced on columns 10. FIG. 5 shows an arrangement for a four tube socket that can be mounted vertically or horizontally. Four tube socket 60 consists of a casing 61 and a front plate 62. In front plate 62 are four socket receiving openings 63. Fluorescent tube sockets 35 are received in openings 63 and are connected to the ballast (not shown) by a plurality of wires 64. The ballast is advantageously installed within casing 61. Four tube socket assembly 60 can be vertically installed in a suitable opening provided in column 10, or can be horizontally installed upon column 10 by attaching it to the outside thereof.

Figure 6:
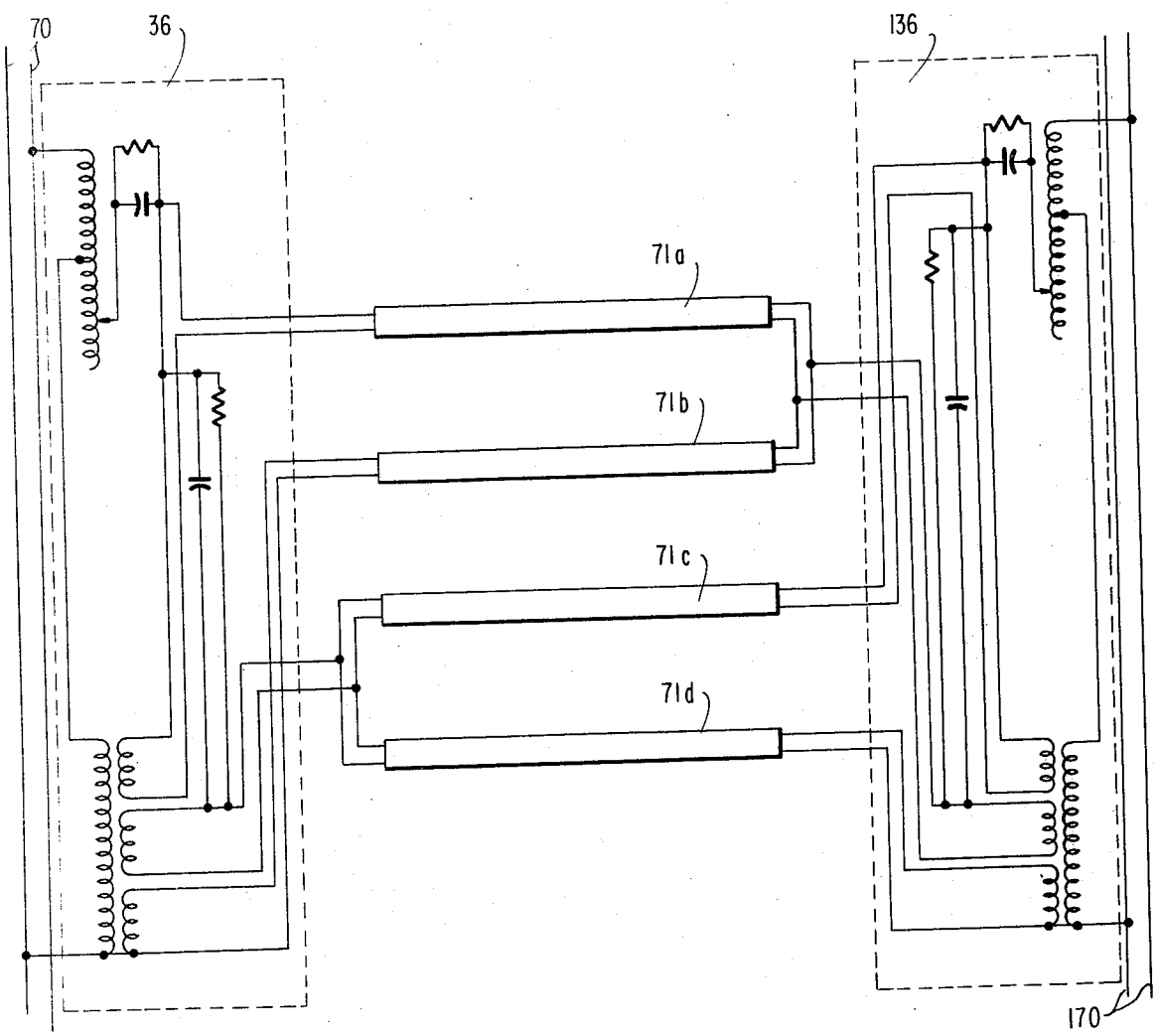
FIG. 6 is a diagrammatic showing of the electrical circuitry in accordance with this invention.

The wiring of the fluorescent tubes and the ballast transformers in the arrangement described herein is shown in the schematic diagram of FIG. 6. The ballast transformers 36 and 136 are mounted in their opposed relationship in different ones of the columns 10. The power mains 70 and 170, which extend through the columns 10, make input power readily available to each of the ballast transformers immediately adjacent their locations in the columns 10. It should be understood that a number of ballast transformers are contemplated for each column and that the power mains illustrated provide power for each of these ballast transformers. Similarly, it should be understood that each of the power mains 70 and 170 may be provided with a receptacle connection at the base of each of the columns 10. For the purposes of illustration each of the ballast transformers 36 and 136 is shown as a two ramp ballast. Lamps 71a and 71b are electrically connected in a known manner to a first side of ballast 36, and these same lamps are connected to a second side of ballast 136. Conversely, lamps 71c and 71d are connected to a first side of ballast 136, and each of these lamps is connected to a second side of ballast 36. While FIG. 6 depicts the wiring of a two tube ballast, it is contemplated that ballast constructed to have any number of fluorescent tubes connected thereto may be used and wired in a similar fashion. Moreover, in the illustrated embodiment it is not necessary that ballasts 36 and 136 be connected to the same tubes. That is, for example, tubes 71a and 71b may be connected to the second side of a ballast transformer other than ballast 136, and the second side of ballast 136 may be connected to a pair of fluorescent tubes other than 71a and 71b. The remainder of the connections would remain unchanged. In FIG. 6 a complete schematic of the typical ballast transformer is shown. The elements within the ballast transformer are, however, not described in detail, because these are well known to those skilled in the art. Such ballasts are described in "Primer of Lamps and Lighting," Allphin, Sylvania Electric Products, Inc., 1965, pages 81 through 94. The above described wiring arrangement whereby ballasts are connected to different fluorescent tubes rather than to both ends of the same fluorescent tube, as is normally the case, effects a substantial saving in wire. For example, over 300 feet of wire can be saved in an eight foot display arrangement having 32 fluorescent tubes. Moreover, the improved ballast wiring provides a substantially lighter structure and contributes meaningfully to portability, ease of construction, and aesthetic appeal of the apparatus described herein. Since no cross-over wires are required, the entire ballast wiring can be supported on an upright column 10 with a single connection (e.g., receptacle or plug) provided to connect to an outside power source. The built-in power connection permits the wiring to be completed when the upright supports are manufactured and simplifies on-site construction. The installation of power mains extending up each column 10 permits the power side of the ballasts to be connected to the power main adjacent the ballast and further contributes to a saving in wire.

This apparatus can be modified within the scope of the invention in order to vary or to enhance the intensity and distribution of the light with respect to the various trays 20. For example, fluorescent tubes 23 need not be positioned exactly as shown in FIG. 1, but can be varied in vertical spacing to provide exactly the illumination desired. Also, shelves 20 can be provided with reflecting surfaces, or can be transparent or translucent. Accessory systems contributing to the control of plant growth, such as fans and irrigation systems, (not shown) can also be provided. Furthermore, the apparatus can itself be placed in a chamber in which the environment is controlled.

Many modifications and variations of the embodiments herein shown and described are possible, and the invention is to be limited only by the scope of the appended claims.

I claim:
1. Plant growth apparatus comprising:
   a pair of hollow horizontally opposed upright support columns,
   a plurality of fixed horizontal trays supported by said columns a plurality of pairs of fluorescent tube sockets mounted in aligned opposed relationship on said columns,
   a plurality of fluorescent tubes plugged into said opposed pairs of sockets and supported thereby, said fluorescent tubes being so positioned with respect to said trays as to illuminate said trays,
   at least one pair of ballasts, one of said ballasts being supported by one of said columns adjacent said tube sockets and the other of said ballasts being supported by the other of said columns adjacent said tube sockets,
   ballast leads connecting each of said fluorescent tubes between the first side of one of said ballasts at its respective said column and the second side of the other of said ballasts at its respective said column, and
   a power main extending through each of said columns, each said ballast being connected to said power main.
2. Plant growth apparatus according to claim 1, wherein said trays are positioned in a vertical row on both sides of said columns.
3. Plant growth apparatus according to claim 1, wherein each of said columns has support legs attached to the lower end thereof.
4. Plant growth apparatus according to claim 1 further comprising means permitting the altering of the vertical positions of said trays upon said columns.

* * * * *